W. LOYD.
Stereoscopic Instrument.
No. 14,670. Patented April 15, 1856.
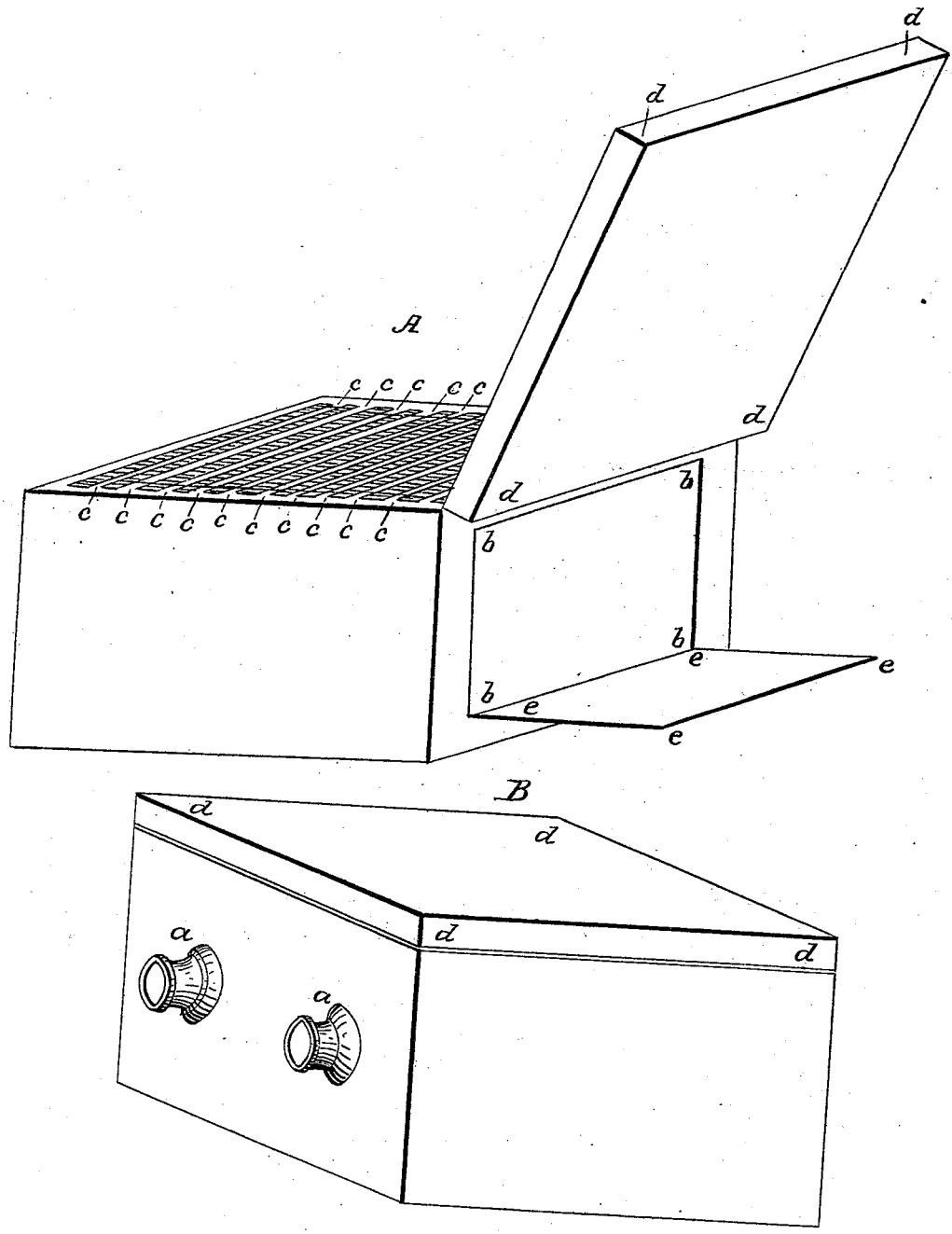
Witnesses:
F. Langenheim
H. Luthol
Inventor:
William Loyd

UNITED STATES PATENT OFFICE.

WILLIAM LOYD, OF PHILADELPHIA, PENNSYLVANIA.

STEREOSCOPE-CASE.

Specification of Letters Patent No. 14,670, dated April 15, 1856.

*To all whom it may concern:*

Be it known that I, WILLIAM LOYD, of the city and county of Philadelphia, in the State of Pennsylvania, have invented a new and useful Improvement in Connection with Stereoscope Instruments; and I do hereby declare that the following is a full, clear, and exact description of the same, its construction and operation, reference being had to the annexed drawings, making a part of this specification, of which—

1 and 2 are both perspective views from opposite points, a, a, representing the tubes containing the stereoscopic lenses, b, b, the opening in the box opposite the tubes, c, c, c, the grooves which receive the pictures; d, d, the lid of the box; e, e, the hinged lid for the side opening b, b.

The nature of my improvement consists in constructing a box which serves as a receptacle for a number of pictures in grooves and at the same time serving as a stereoscope to examine the same and allowing of a proper adjustment of focus by placing the pictures to be examined in one of the grooves more or less distant from the lenses according to the eyesight of the spectator.

The construction and operation of my improvement is described in the following: I take a box as wide as the stereoscopic pictures are long and one or two inches longer than the focus of the lenses employed, say 7 inches wide by 6 or 7 inches long, with a lid attached to the same. In the front board of this box I insert the tubes a, a, inclosing the stereoscopic lenses. The board opposite to these tubes has an opening b, b, about 2 by 5 inches, which opening can be closed at pleasure by means of a board e, e, hinged to the box. In the inside of the box the two sides are provided with grooves c, c, of sufficient number in which the pictures are kept when not used for examination, and in which state the box serves as a receptacle for the safekeeping of the pictures. When the box is to be used as a stereoscope for viewing the pictures, all are taken out except one, which is put in one of the grooves more or less distant from the lenses according to the eyesight of the person using the instrument. If the picture on examination is of such a nature as to require transmitted light, as for instance a picture on transparent substances as glass, etc., the cover e, e, of the opening b, b, is removed during examination. If however the picture is of such a nature as to require the reflected light for examination, such as daguerreotypes ambrotypes or paper pictures the lid of the box is kept open or a piece of ground glass is inserted in the same to admit the light from above.

I do not claim the use or construction of stereoscopic lenses, which were known and used before my improvement.

What I claim and desire to secure by Letters Patent as my invention is—

The construction of a grooved box in combination with stereoscopic lenses, to hold a number of pictures, and the adjustment of the focus by means of placing the picture in one of the grooves more or less distant from the lenses according to the eyesight of the spectator, substantially as described in the foregoing specification.

WILLIAM LOYD.

Witnesses:
F. LENGENHEIM,
WILSON LOYD.